United States Patent Office 3,790,686
Patented Feb. 5, 1974

3,790,686
BITTER SUBSTANCES AND THEIR
PREPARATION
David Stanley John Gardner, Reigate, and John Anthony Morrell, Horley, England, assignors to White Tomkins Limited, Reigate, Surrey, England
Filed May 17, 1972, Ser. No. 254,028
Claims priority, application Great Britain, May 18, 1971, 15,660/71
Int. Cl. C12c 9/02
U.S. Cl. 426—349          6 Claims

ABSTRACT OF THE DISCLOSURE

A solution of β-acids extracted from hops was prepared in methanol, a polar organic solvent. The solution was made alkaline and stirred with sodium hypochlorite. The product was extracted with ether after acidification and found to be bitter substance. The potassium salt of the substance was water solution. The substance and its salt can be added to beer to enhance its bitterness.

BACKGROUND OF THE INVENTION

Figure 1:
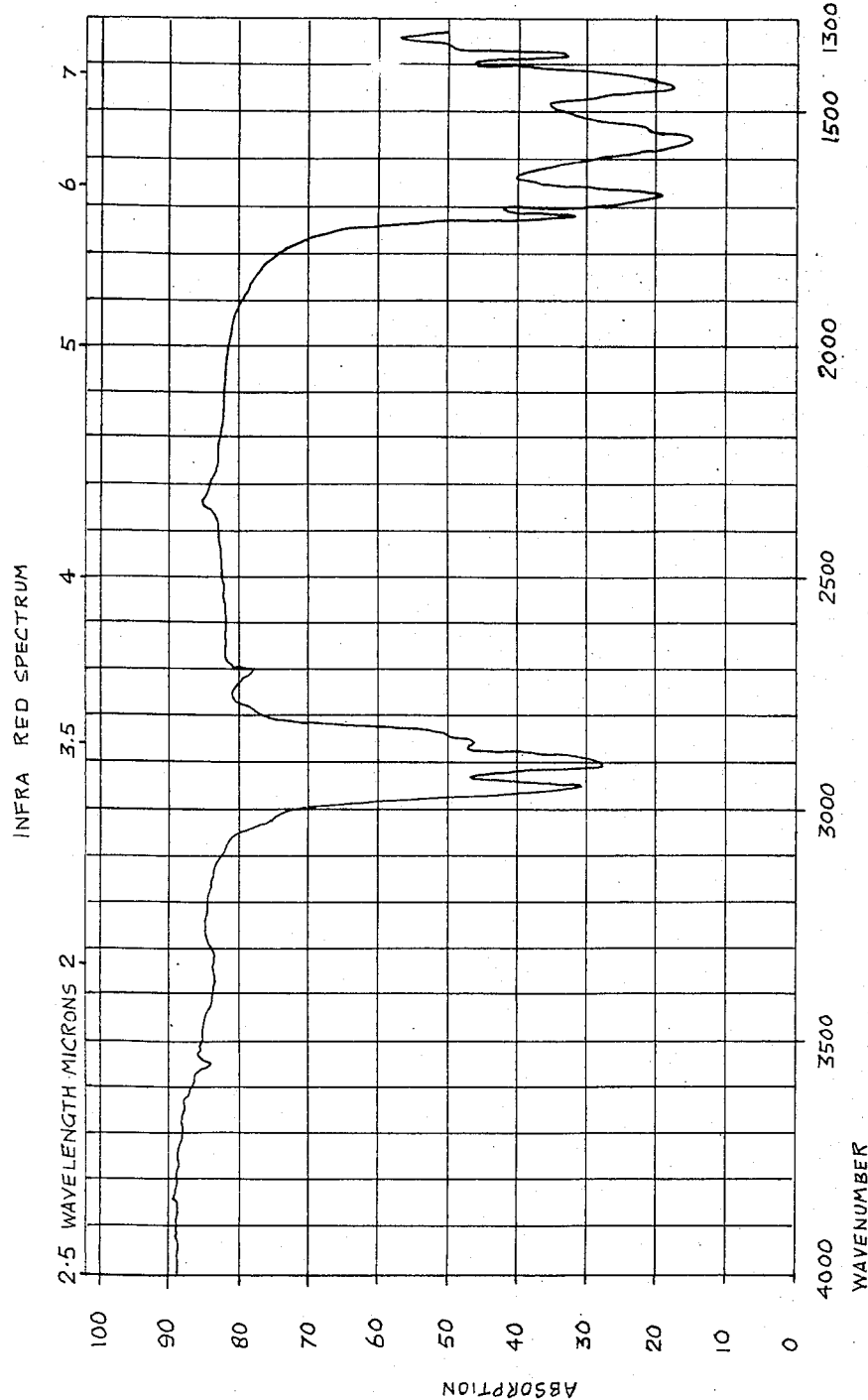
Figure 2:
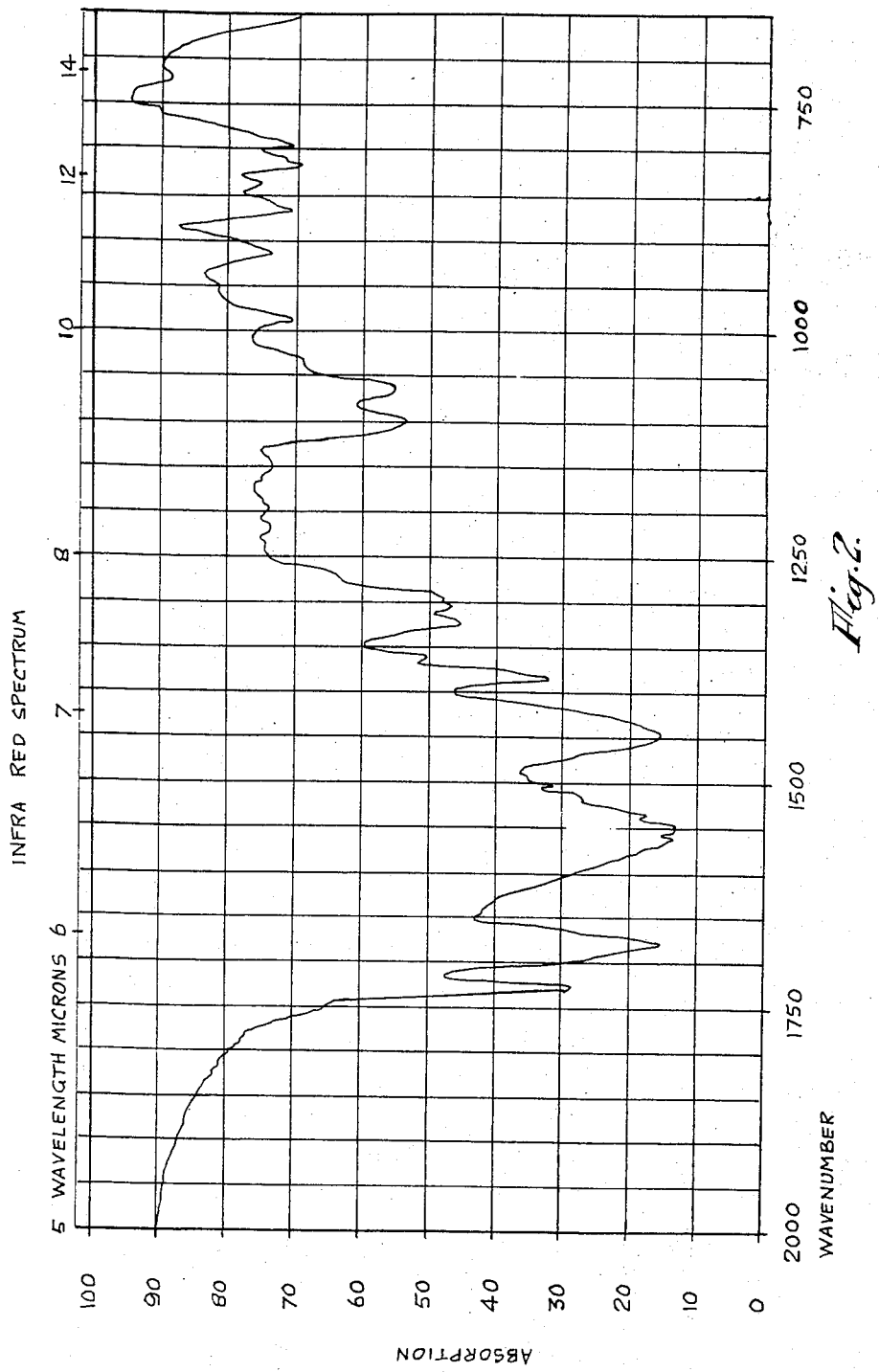

This invention relates to certain new substances which we have found to have a bitter taste and methods of making such substances.

Methods for the production of bittering adjuncts for beer containing the isomerized α-acids derived from hops are well known. However, such methods tend to result in the accumulation of unwanted byproducts, as is shown for example by British patent specification 1,183,669 and our British specification 1,259,140. In particular, these byproducts include hop resin constituents which, owing to their insolubility in beer, should be eliminated as far as is practicable from the finished bittering adjunct containing the iso-α-acids.

Certain of these resin constituents, known as the β-acids (including lupulone, copulone and analogues), are readily obtainable as a byproduct from the manufacture of isomerized hop extracts, but previous attempts to produce a useful bitter tasting derivative have resulted in a mixture of compounds (e.g. Kuroiwa and Hashimoto, Rept. Res. Lab. Kirin Brewery Co. Ltd. No. 6, pp. 27–33, 1963) only some of which are found to be bitter and thus of little use as bittering adjuncts for beer.

SUMMARY OF THE INVENTION

According to this invention, we have discovered a reaction product which we have found to have a bitter taste, obtainable by treating β-acids with the hypohalite of an alkali metal under alkaline conditions in a polar solvent. The invention also includes the alkai metal salts of the halogen-containing reaction products, which we have found to be soluble in aqueous media.

The invention also includes a method of preparing a bitter substance comprising reacting β-acids with the hypohalite of an alkali metal under alkaline conditions in a polar solvent and isolating the resultant reaction product.

The β-acids may be in the form of a pure β-acid, such as colupulene or lupulone, or may be in the form of a mixture of β-acids alone or forming part of a hop extract.

The hop extract is dissolved in a polar solvent and any insoluble matter discarded before treatment with hypohalite. The hypohalite is preferably sodium hypochlorite, but hypobromite could be used, or the potassium salt. The solvent can conveniently be aqueous methanol, but water or aqueous ethanol could be used. We have found that the reaction can be carried out in the cold.

It is preferred to isolate the bitter substances in the form of their potassium salts for optimum solubility in aqueous medium. The potassium salts may be prepared by treating the bitter substance with a weak or strong potassium alkali.

We believe the bitter substances obtained by reaction of β-acids with the hypohalite of an alkaline metal under alkaline conditions to be compounds of the formula:

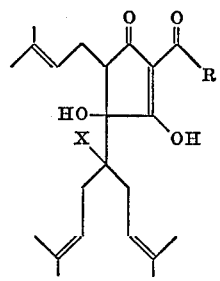

(I)

in which R is an akyl group dependent on which of the β-acids is present (i.e. lupulone, colupulone, adlupulone etc.) and X is a halogen, preferably chlorine.

We have found that the bitter substances (I) can be used as bittering adjuncts for addition to sweet or partially bittered beer before or after fermentation, but before filtering. They provide useful intermediates in the synthesis of other bitter substances. We have found the bitter substance to be produced in excellent yield.

DESCRIPTION OF A SPECIFIC EMBODIMENT

The following example serves to illustrate the invention. The example relates to the preparation of bitter substances from colupulone, which is the principal β-acid present in English hops.

Example

Crystalline colupulone (80 g.) was dissolved in methanol( 400 ml.) with warming and 5% aqueous potassium hydroxide (260 ml.) added slowly while stirring with a magnetic stirrer. During the addition, the solution became cloudy, clearing when all the alkali had been added to give a solution of pH–12.5. To this solution was added slowly a 25% solution of sodium hypochlorite 10–14% available chlorine/600 ml.) To the resultant turbid mixture was added diethyl ether (300 ml.) and the whole was acidified with concentrated hydrochloric acid. After shaking, the phases were allowed to separate and the ether layer removed. A second ether extraction of 250 ml. was bulked with the former and the combined extracts dried over anhydrous sodium sulphate, filtered and evaporated to yield 81.4 g. of an orange colored oil.

The crude product was purified by passage through a column of Deacidite FF (24″ x 1″ dia., 14–52 mesh acetate form). Impurities were eluted with methanol (350 ml.) and the purified product with sodium acetate buffer pH 10.0 in 80% methanol (1000 ml.). The purified product 8.5 g.) was examined by layer chromatography on silica gel with benzene:ether, 16:1 solvent and revealed a single substance (RF 0.65), colored yellow with a ferric chloride spray. Ion exchange chromatography on Deacidite FF (1 meter x 6 mmφ 17μ microbead resin acetate form) with a pH 4.8 acetic acid-sodium acetate buffer also showed the product to consist of a single substance. Infrared, ultraviolet and nuclear magnetic resonance spectra, as shown in the accompanying spectrum in conjunction with elemental analysis were in agreement with the structure:

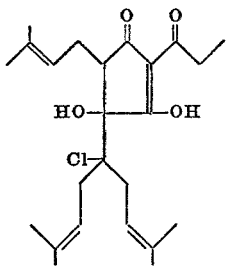

The Compound I was found to give potassium salts soluble in aqueous media prepared by treatment with a potassium salt, and bitter to the taste, which was suitable for use as bittering adjuncts for addition to sweet or partially bittered beer after or before fermentation. The product was found to have approximately 20% of the bitterness of the well known iso-α-acids.

The ultraviolet absorption characteristics of the above compound are as follows:

In alkaline solution—$\lambda_{max}$ 280 m$\mu$ $\lambda_{min}$ 240 m$\mu$
In acid solution—$\lambda_{max}$ 240 and 283 m$\mu$ $\lambda_{min}$ 258 m$\mu$

What is claimed is:

1. A process for producing a bitter substance from β-acids which includes preparing a solution of β-acids in a polar solvent, treating the solution with a hypohalite of an alkali metal under alkaline conditions and isolating the bitter reaction product.

2. A process as claimed in claim 1 in which the hypohalite is sodium hypochlorite.

3. A process as claimed in claim 1 in which the polar solvent is aqueous methanol.

4. A process as claimed in claim 1 in which the isolation of the bitter reaction product includes the steps of contacting the reaction product solution with an immiscible organic solvent, acidifying, separating the organic solvent phase and evaporating of the organic solvent to obtain the bitter reaction product.

5. A process for producing a bitter substance from β-acids which include dissolving pure β-acids in methanol to form a β-acids solution, adding potassium hydroxide to form an alkaline solution, treating the alkaline solution with sodium hypochlorite and isolating the bitter reaction product.

6. A process as claimed in claim 1 including a further step of treating the bitter reaction product with a weakly alkaline potassium salt to obtain the potassium salt of the bitter reaction product.

References Cited
UNITED STATES PATENTS 2,652,333   9/1953   Nilsson _____ 99—50.5

LIONEL M. SHAPIRO, Primary Examiner

R. B. PENLAND, Assistant Examiner